(12) United States Patent
Haque et al.

(10) Patent No.: US 9,272,483 B2
(45) Date of Patent: Mar. 1, 2016

(54) METHODS, SYSTEMS AND PRODUCTS INVOLVING SHEET PRODUCTS

(71) Applicant: Georgia-Pacific Consumer Products LP, Atlanta, GA (US)

(72) Inventors: Ehteshamul Haque, Duluth, GA (US); Chiehlung Jay Hsu, Alpharetta, GA (US); David L. B. Knudsen, Buford, GA (US); Bruce Jerome Kokko, Neenah, WI (US); Steven B. Mattheeussen, Greenville, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 363 days.

(21) Appl. No.: 13/799,439

(22) Filed: Mar. 13, 2013

(65) Prior Publication Data

US 2013/0225385 A1  Aug. 29, 2013

Related U.S. Application Data

(62) Division of application No. 12/607,195, filed on Oct. 28, 2009, now Pat. No. 8,747,721.

(51) Int. Cl.
| | |
|---|---|
| *B31D 99/00* | (2006.01) |
| *B65H 19/22* | (2006.01) |
| *F16C 13/00* | (2006.01) |
| *B31C 5/00* | (2006.01) |

(52) U.S. Cl.
CPC . *B31D 99/00* (2013.01); *B31C 5/00* (2013.01); *B65H 19/2276* (2013.01); *B65H 19/2292* (2013.01); *F16C 13/00* (2013.01); *B65H 2301/41361* (2013.01); *B65H 2701/18442* (2013.01); *B65H 2701/5112* (2013.01)

(58) Field of Classification Search
None
See application file for complete search history.

(56) References Cited

U.S. PATENT DOCUMENTS

| | | | |
|---|---|---|---|
| 1,408,126 A | 2/1922 | Mumm | |
| 1,459,596 A | 6/1923 | Mayo | |
| 1,882,012 A | 10/1932 | Hires | |
| 1,922,716 A | 8/1933 | Robinett | |
| 1,930,250 A | 10/1933 | Mulligan | |
| 2,270,806 A * | 1/1942 | Johnson | 403/107 |
| 2,332,371 A | 10/1943 | Corbin et al. | |
| 2,380,644 A | 7/1945 | Grondona | |
| 2,772,838 A | 12/1956 | Lenz | |

(Continued)

FOREIGN PATENT DOCUMENTS

| | | |
|---|---|---|
| CA | 2528335 A1 | 1/2005 |
| DE | 3911250 C1 | 5/1990 |

(Continued)

OTHER PUBLICATIONS

Chinese Office Action and Search Report date of Notification Apr. 1, 2014 for CN Application No. 201080047995.7; 10 pages.

(Continued)

*Primary Examiner* — Jeffrey Wollschlager
(74) *Attorney, Agent, or Firm* — Laura L. Bozek

(57) ABSTRACT

A method for forming a tubular sheet product roll includes providing a sheet product roll having a first configuration and a void, centering a rotational axis of the sheet product roll on a longitudinal axis of a first tool, and inserting the first tool into the void of the sheet product roll to define an inner diameter of the void and to form the sheet product roll having a second configuration different from the first configuration.

19 Claims, 14 Drawing Sheets

(56) References Cited

U.S. PATENT DOCUMENTS

| | | | |
|---|---|---|---|
| 3,101,914 A | | 8/1963 | Lorenz et al. |
| 3,106,362 A | | 10/1963 | Sukala, Jr. |
| 3,131,880 A | | 5/1964 | Miller et al. |
| 3,610,545 A | | 10/1971 | Reifenhauser et al. |
| 3,713,601 A | | 1/1973 | Buhrman et al. |
| 3,847,366 A | * | 11/1974 | Schmidt et al. ............ 242/533.7 |
| 3,907,476 A | * | 9/1975 | Reilly ........................ 425/305.1 |
| 3,924,743 A | | 12/1975 | Bittner |
| 3,941,328 A | | 3/1976 | Johnson |
| 4,015,711 A | | 4/1977 | Mason |
| 4,149,682 A | * | 4/1979 | Gustafson et al. ......... 242/571.3 |
| 4,184,648 A | | 1/1980 | Mergell |
| 4,254,918 A | | 3/1981 | Huggins |
| 4,362,278 A | | 12/1982 | Hopkinson |
| 4,487,378 A | | 12/1984 | Kobayashi |
| 4,762,061 A | | 8/1988 | Watanbe et al. |
| 4,783,015 A | | 11/1988 | Shimizu et al. |
| 5,100,075 A | | 3/1992 | Morand et al. |
| 5,186,099 A | | 2/1993 | Qing et al. |
| 5,271,575 A | * | 12/1993 | Weinert ........................ 242/520 |
| 5,277,060 A | * | 1/1994 | Lehman et al. ............ 73/116.08 |
| 5,277,375 A | | 1/1994 | Dearwester |
| 5,281,386 A | * | 1/1994 | Weinert ........................ 264/512 |
| 5,322,234 A | | 6/1994 | Robert et al. |
| 5,337,895 A | | 8/1994 | Mitelman et al. |
| 5,352,319 A | * | 10/1994 | Ishizu ................... B65H 19/22 156/184 |
| 5,366,175 A | | 11/1994 | Schutz |
| 5,370,339 A | | 12/1994 | Moody et al. |
| 5,387,284 A | | 2/1995 | Moody et al. |
| 5,451,013 A | | 9/1995 | Schutz |
| 5,467,936 A | | 11/1995 | Moody |
| 5,474,436 A | * | 12/1995 | Yamazaki ..................... 425/103 |
| 5,495,997 A | | 3/1996 | Moody |
| 5,620,148 A | | 4/1997 | Mitchell |
| 5,660,349 A | | 8/1997 | Miller et al. |
| 5,669,576 A | | 9/1997 | Moody |
| 5,722,608 A | | 3/1998 | Yamazaki et al. |
| 5,849,357 A | | 12/1998 | Andersson |
| 5,875,985 A | * | 3/1999 | Cohen et al. ............... 242/160.4 |
| 6,021,973 A | | 2/2000 | Makino et al. |
| 6,070,821 A | | 6/2000 | Mitchell |
| 6,082,664 A | | 7/2000 | Phelps et al. |
| 6,129,304 A | | 10/2000 | Biagiotti |
| 6,299,099 B1 | | 10/2001 | Miller et al. |
| 6,342,297 B1 | | 1/2002 | LaBrash |
| 6,422,575 B1 | | 7/2002 | Czaplicki et al. |
| 6,713,184 B1 | | 3/2004 | Ferencz et al. |
| 6,733,608 B1 | | 5/2004 | Baggot et al. |
| 6,955,320 B2 | | 10/2005 | Martinez |
| 7,540,366 B2 | | 6/2009 | Lindberg |
| 7,992,818 B2 | | 8/2011 | Maddaleni et al. |
| 2005/0066457 A1 | | 3/2005 | McKay |
| 2005/0139721 A1 | * | 6/2005 | Andersson ................ 242/599.4 |
| 2005/0150996 A1 | | 7/2005 | Schmidt-Hebbel et al. |
| 2005/0184191 A1 | | 8/2005 | van de Camp |
| 2006/0196990 A1 | | 9/2006 | Wallace |
| 2007/0054557 A1 | | 3/2007 | Larsson |
| 2007/0057103 A1 | | 3/2007 | Malecot et al. |
| 2007/0114321 A1 | | 5/2007 | Cattacin et al. |
| 2007/0240295 A1 | | 10/2007 | Yamada et al. |
| 2007/0262193 A1 | | 11/2007 | Chapman |
| 2008/0105394 A1 | | 5/2008 | Kokko |
| 2009/0057456 A1 | | 3/2009 | Shannon et al. |
| 2009/0101748 A1 | | 4/2009 | Maddaleni et al. |
| 2009/0236464 A1 | | 9/2009 | Cittadino et al. |
| 2011/0079671 A1 | | 4/2011 | Wojcik et al. |
| 2011/0095116 A1 | | 4/2011 | Hada et al. |

FOREIGN PATENT DOCUMENTS

| | | |
|---|---|---|
| DE | 102008053673 | 5/2009 |
| EP | 0842881 A2 | 5/1998 |
| GB | 1554619 A | 10/1979 |
| JP | 6191699 | 12/1994 |
| JP | 09124193 A | 5/1997 |
| JP | 10001241 A | 1/1998 |
| JP | 2000177894 A | 6/2000 |
| RU | 2152752 C2 | 7/2000 |
| RU | 2189347 C2 | 9/2002 |
| RU | 2232177 C2 | 7/2004 |
| WO | 99-42393 A1 | 8/1999 |
| WO | 0240387 A1 | 5/2002 |
| WO | 2005005295 A1 | 1/2005 |
| WO | 2006117821 A1 | 9/2006 |

OTHER PUBLICATIONS

Office Action—Final for U.S. Appl. No. 12/607,195, filed Oct. 28, 2009; First amed Inventor: Ehteshamul Haque; Mailing Date: May 23, 2013; 10 pages.

Russian Federation Office Action dated Nov. 10, 2014 for RU Application No. 2012121890; 7 pages.

English machine translation of JP 09124193, filed May 13, 1997.

English machine translation of JP 10001241, filed Jan. 6, 1998.

International Preliminary Report on Patentability for International Application No. PCT/US2010/054037; Mailed May 10, 2012; International Filing Date: Oct. 26, 2010; 12 pgs.

International Search Report for International Patent Application No. PCT/US2010/054037; International Filing Date: Oct. 26, 2010; mailed Jun. 4, 2011; 7 pages.

Written Opinion for International Application No. PCT/US2010/054037; International Filing Date: Oct. 26, 2010; Mailed May 12, 2011; 10 pgs.

\* cited by examiner

US 9,272,483 B2

METHODS, SYSTEMS AND PRODUCTS INVOLVING SHEET PRODUCTS

CROSS REFERENCE TO RELATED APPLICATIONS

This application is a divisional of the legally related U.S. Application Ser. No. 12/607,195 filed Oct. 28, 2009; which is fully incorporated herein by reference.

BACKGROUND OF THE INVENTION

The present disclosure relates generally to methods and systems for manufacturing sheet products.

Sheet products such as, for example, absorbent sheets are often packaged in tightly wound rolls. Tightly winding sheet product allows additional sheet product to fit on a roll with a desired outer diameter. The roll is often installed in a dispenser having spindles that engage a void in the center of the roll. In some manufacturing processes, the void may become undesirably obstructed or deformed.

An effective and efficient method and system for manufacturing tightly wound rolls of sheet product that may be easily used in a dispenser is desired.

BRIEF DESCRIPTION OF THE INVENTION

The above described and other features are exemplified by the following Figures and Description in which an embodiment of a method for forming a tubular sheet product roll includes providing a sheet product roll having a first configuration and a void, centering a rotational axis of the sheet product roll on a longitudinal axis of a first tool, and inserting the first tool into the void of the sheet product roll to define an inner diameter of the void and to form the sheet product roll having a second configuration different from the first configuration.

A tubular roll of sheet product prepared by a process includes the method of centering a rotational axis of the sheet product roll on a longitudinal axis of a first tool, and inserting the first tool into the void of the sheet product roll to define an inner diameter of the void and to form the sheet product roll having a second configuration different from the first configuration.

A system for forming a core of a tubular sheet product roll includes a first tool operative to define a first portion of the core of the tubular sheet product roll, a first linkage connected to the first tool operative to move the first tool linearly along a linear axis of the first tool, and a second linkage connected to the first tool operative to rotate the first tool axially about the linear axis of the first tool.

A method for forming a tubular sheet product roll includes providing a sheet product roll having a sheet product wound on a removable core, the removable core having a first distal end, a second distal end and a longitudinal surface, centering a rotational axis of the sheet product roll on a longitudinal axis of a first tool, and engaging the first distal end of the removable core with the first tool to slidably move the removable core relative to the sheet product roll to expose a portion of the longitudinal surface of the removable core.

A sheet product includes a length of a wound first sheet product material defining a tubular roll having an outer diameter, and a semi-rigid core portion comprising the first sheet product material defining an outer diameter of a void portion concentric to the outer diameter of the roll.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of systems and methods for manufacturing sheet products are provided.

In this regard, the term "sheet products" as used herein is inclusive of natural and/or synthetic cloth or paper sheets. Sheet products may include both woven and non-woven articles. There are a wide variety of nonwoven processes and they can be either wetlaid or drylaid. Some examples include hydroentagled (sometimes called spunlace), DRC (double re-creped), airlaid, spunbond, carded, paper towel, and meltblown sheet products. Further, sheet products may contain fibrous cellulosic materials that may be derived from natural sources, such as wood pulp fibers, as well as other fibrous material characterized by having hydroxyl groups attached to the polymer backbone. These include glass fibers and synthetic fibers modified with hydroxyl groups. Examples of sheet products include, but are not limited to, wipers, napkins, tissues, rolls, towels or other fibrous, film, polymer, or filamentary products.

In general sheet products are thin in comparison to their length and breadth and exhibit a relatively flat planar configuration and are flexible to permit folding, rolling, stacking, and the like. The sheet product may have perforations extending in lines across its width to separate individual sheets and facilitate separation or tearing of individual sheets from the roll at discrete intervals. Individual sheets may be sized as desired to accommodate the many uses of the sheet products. For example, perforation lines may be formed every 13 inches to define a universally sized sheet. Multiple perforation lines may be provided to allow the user to select the size of sheet depending on the particular need. Sheet products may also be imperforated and dispensed in a length that may be determined by a mechanical linkage, or defined in an electronic device. Imperforated sheets may be separated from a roll of sheet products by a tearing device.

Figure 1:
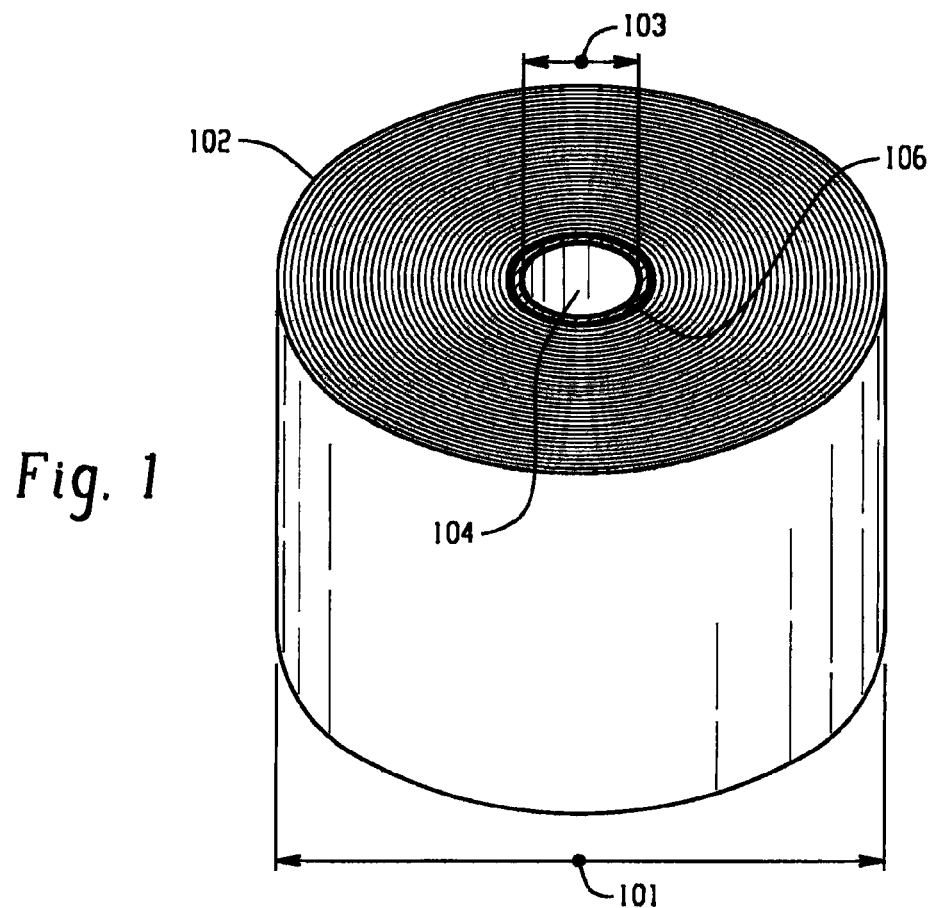
FIG. 1 illustrates a perspective view of an exemplary embodiment of a sheet product roll in accordance with an embodiment of the invention.

FIG. 1 illustrates a perspective view of an exemplary embodiment of a sheet product roll (roll) 102. The roll 102 has an outer diameter 101. A void 104 is defined by the roll 102 and has a void diameter 103. An exemplary method for manufacturing the roll 102 is to wind the sheet product around a spindle (not shown) to form a long tubular roll. When a single turn or a number of turns have been wound on the spindle, the sheet product is moistened with a liquid such as, for example, water or an adhesive. Layers of sheet product in the center of the roll absorb and are softened by the liquid, resulting in a moist portion 106 surrounding the void 104. The moist portion 106 allows the spindle to be easily removed without deforming the roll 102. Once the spindle is removed, a saw or other cutting device may be used to cut the long roll into a plurality of rolls 102. In use, the rolls 102 are often placed on dispenser spindles that are disposed in the void 104. However, the process of cutting the roll 102 into smaller rolls may undesirably collapse the void 104; causing difficulty in placing the roll 102 on the dispenser spindles.

Figure 2A:
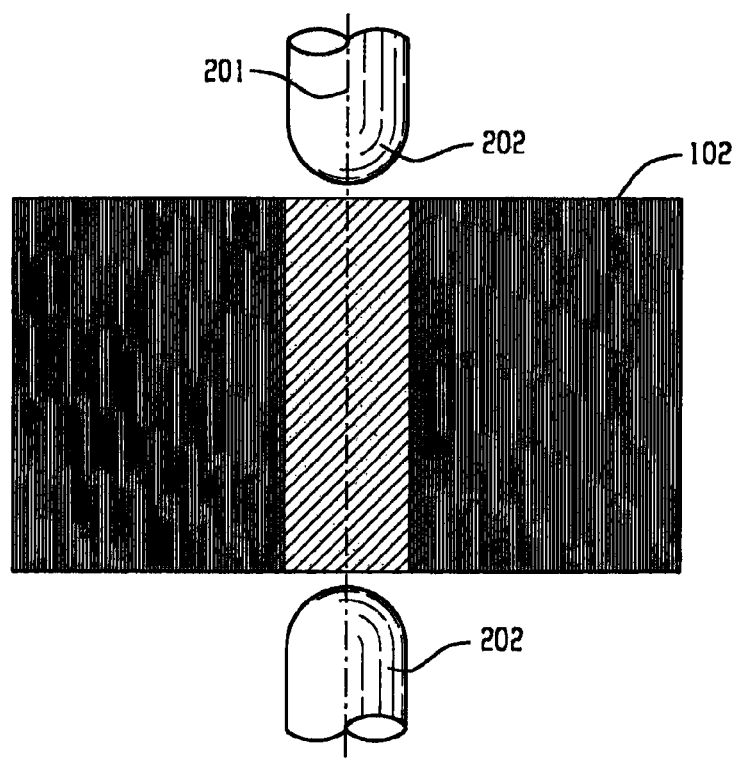
FIG. 2A illustrates a side partially cut-away view of an exemplary embodiment of a portion of a system for reforming the roll of FIG. 1.
Figure 2B:
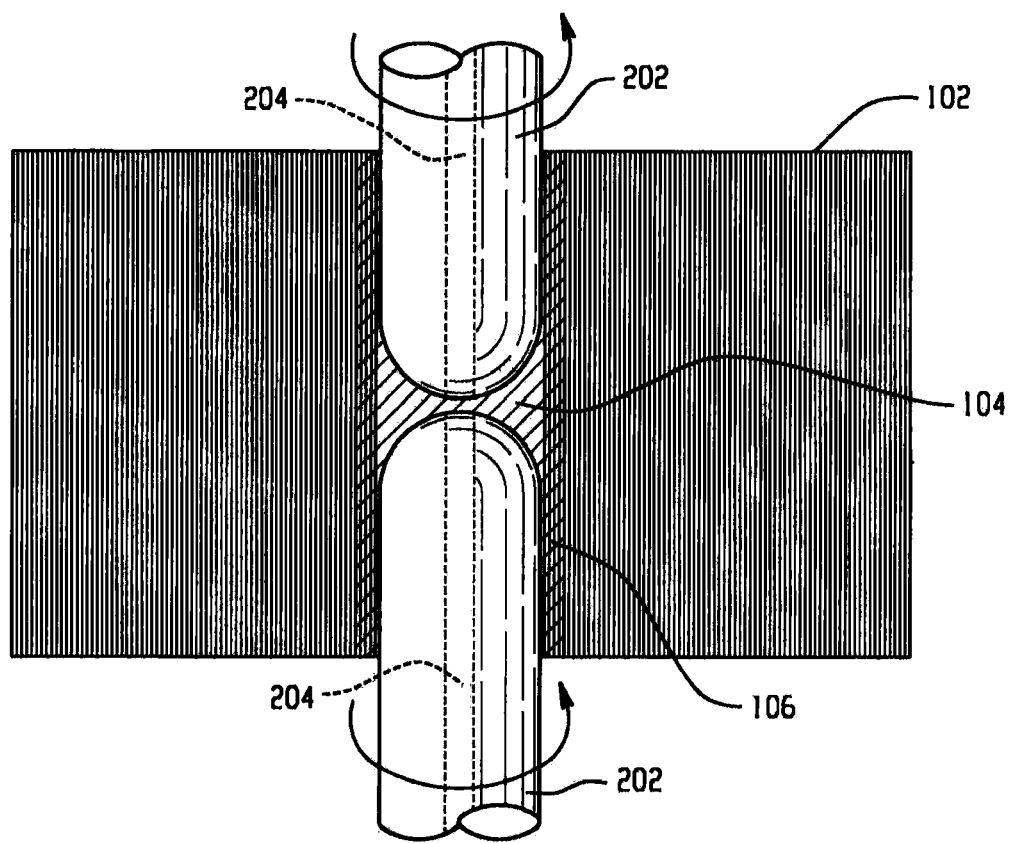
FIG. 2B illustrates the operation of the system of FIG. 2A.

FIG. 2A illustrates a side partially cut-away view of an exemplary embodiment of a portion of a system for reforming the void 104 (FIG. 1) of the roll 102 having an axis of rotation 201. The system includes mandrels 202. The mandrels 202 have an outer diameter similar to the desired void diameter 103 (FIG. 1), and may be fabricated from metal or another suitable material. The illustrated mandrels 202 are cylindrical in shape, and in the illustrated embodiment have curved distal ends. Other embodiments may include pointed or other suitably shaped distal ends that are described below. FIG. 2B illustrates the operation of the system. In operation, the mandrels 202 are inserted into the void 104 from opposing ends of the void 104 along the rotational axis 201 (FIG. 2A) of the roll 102. In the illustrated embodiment the mandrels 202 include heated regions 204. The heated regions 204 may be heated by, for example, an electrically resistive heater, and controlled in a loop with feedback from a thermocouple. The mandrels 202 are rotated along their respective longitudinal axes coaxially with the rotational axis 201 (of FIG. 2A). The pressure of the inserted mandrels 202, the rotation of the mandrels 202, and the heat from the heated regions 204 may remove at least some of the moisture from the moist portion 106, causing the moist portion 106 to become dry, hard, and form a smoother semi-rigid or rigid core portion in the void 104 having a desired void diameter 103 (FIG. 1). The mandrel 202 may have an outer diameter that is greater than the desired void diameter 103 such that shrinkage of the void diameter 103 following the removal of the mandrel 202 results in the desired void diameter 103.

In an alternate embodiment of a method, a mandrel 202 may have ports that are operative to emit a fluid such as, for example water, an adhesive mixture, or another type of fluid such as, a high molecular weight polyethylene glycol (PEG). The fluid may be injected into the moist portion 106 when the mandrel 202 is inserted into the void 104. The fluid may be heated prior to injection. The mandrel 202 may be removed, and the liquid may cool and harden resulting in a composite of sheet product and solidified adhesive or PEG that resists telescoping during removal of the roll 102 from the mandrel 202, and facilitates removal of the mandrel 202.

Figure 2C:
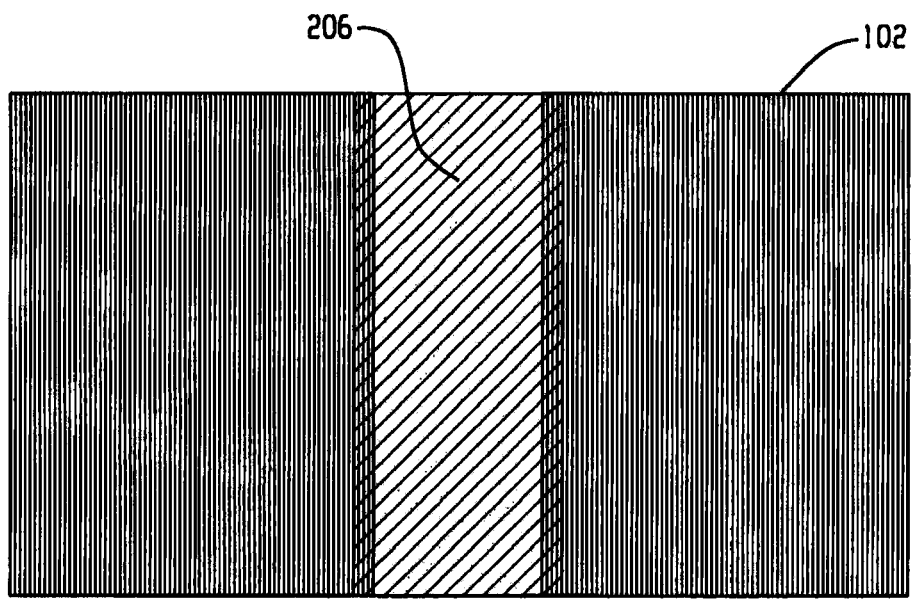
FIGS. 2C and 2D illustrate alternate embodiments of a sheet product rolls.

FIG. 2C illustrates an exemplary embodiment of the resultant roll 102 following the process described above. A resultant semi-rigid or rigid core portion 206 allows the roll 102 to rotate more effectively when placed in a dispenser and maintains the desired diameter of the roll 102.

Figure 2D:
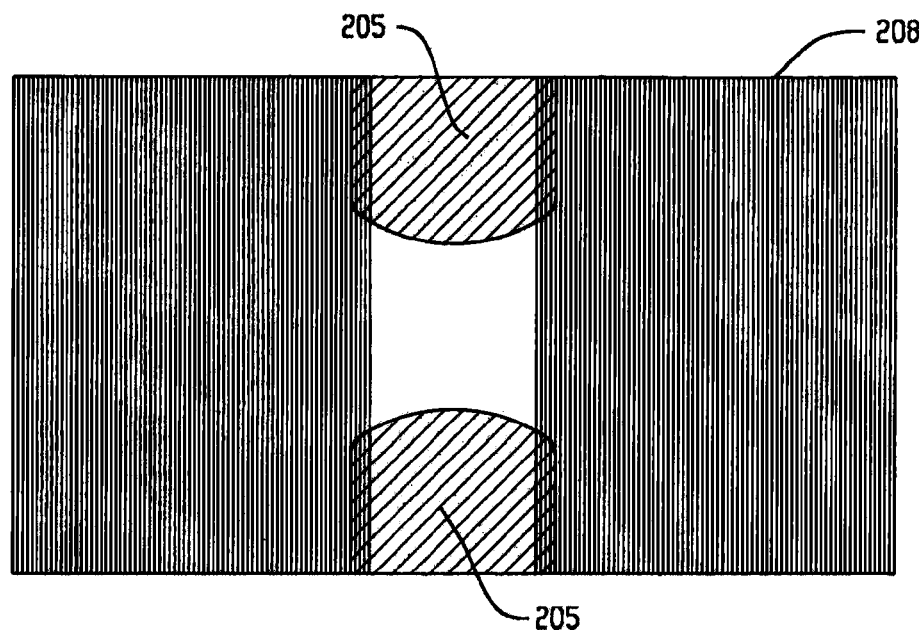

FIG. 2D, with reference to FIG. 2B, illustrates an alternate exemplary embodiment of a roll 208. The roll 208 is similar to the roll 102 described above, however prior to the insertion of the mandrel 202, the roll 208 is moistened in portions of the void 104 resulting in two hardened core portions 205 as shown.

The method described above results in the hardened core portion 205 comprising the dried sheet product material. In an alternate embodiment, the moist portion 106 may be moistened with an alternate liquid such as a diluted adhesive mixture including, for example, cellulose glycol. Thus, a dried core portion resulting from the method described above comprises the tissue product and the impregnated dried adhesive. Other liquids having other characteristics may also be used in a similar process.

The illustrated embodiment includes the mandrels 202 having heated regions 204. Other embodiments may include mandrels 202 that are uniformly heated. Uniformly heated mandrels 202 may effectively harden and form the core portion 205 in the void 104 without rotating the mandrels 202.

Figure 3:
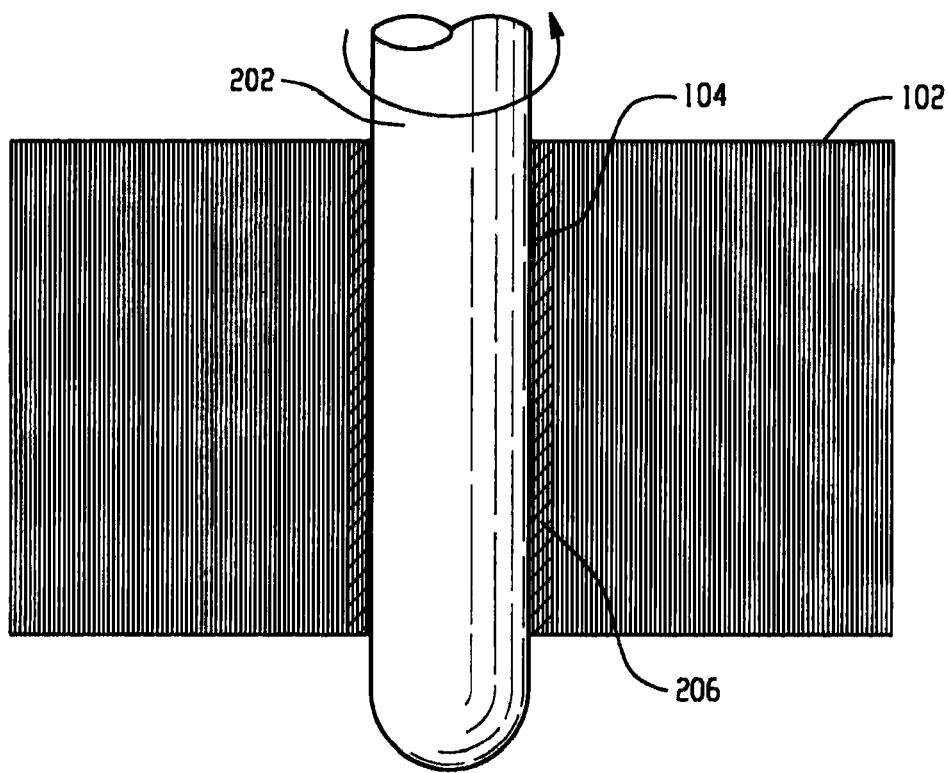
FIG. 3 illustrates an alternate embodiment a portion of a system.

FIG. 3 illustrates an alternate exemplary embodiment of a similar system. In the illustrated embodiment, a single mandrel 202 is inserted into the void 104 and rotated to form the core portion 206 in the void 104.

Figure 4A:
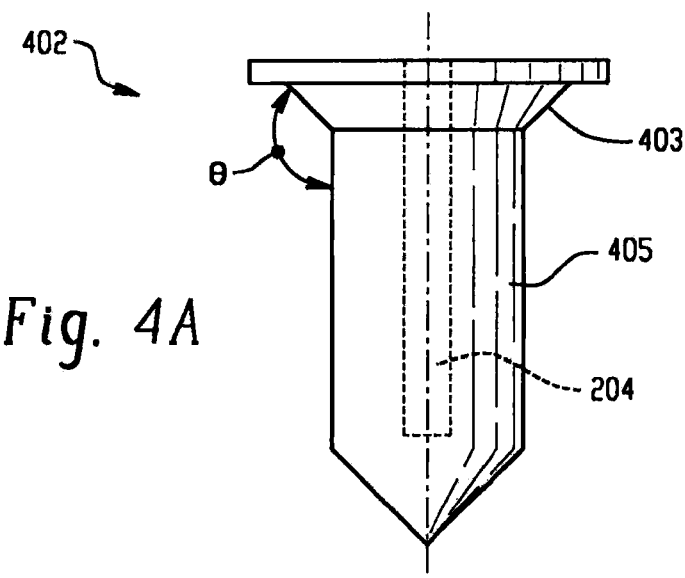
FIGS. 4A-4L illustrate alternate tool embodiments.
Figure 4B:
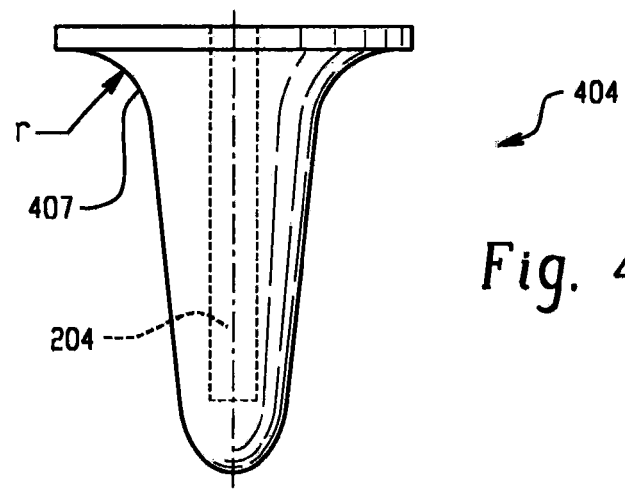
Figure 4C:
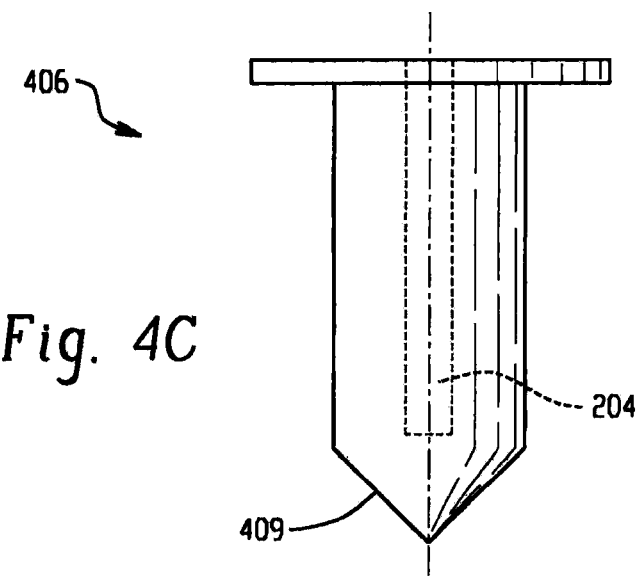
Figure 4D:
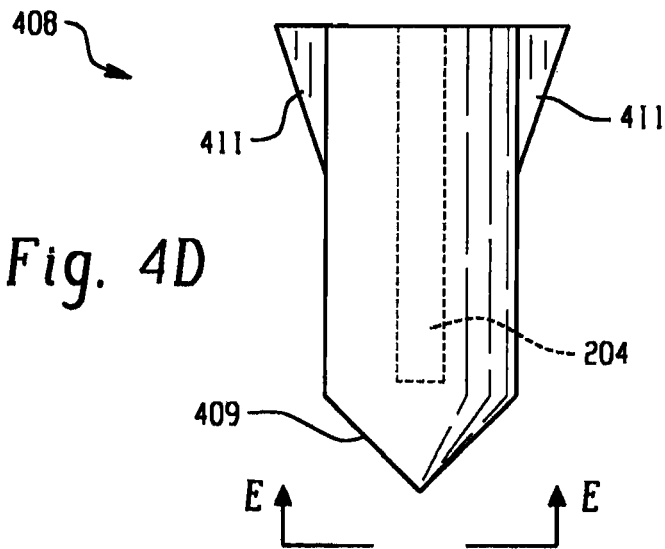
Figure 4E:
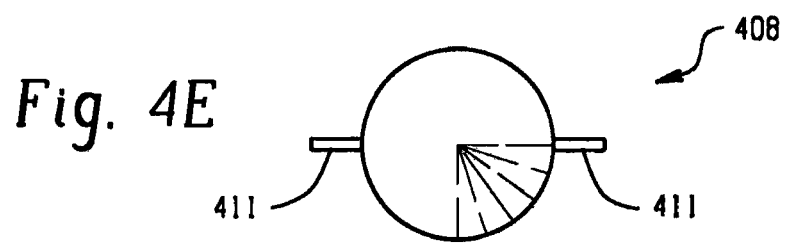
Figure 4F:
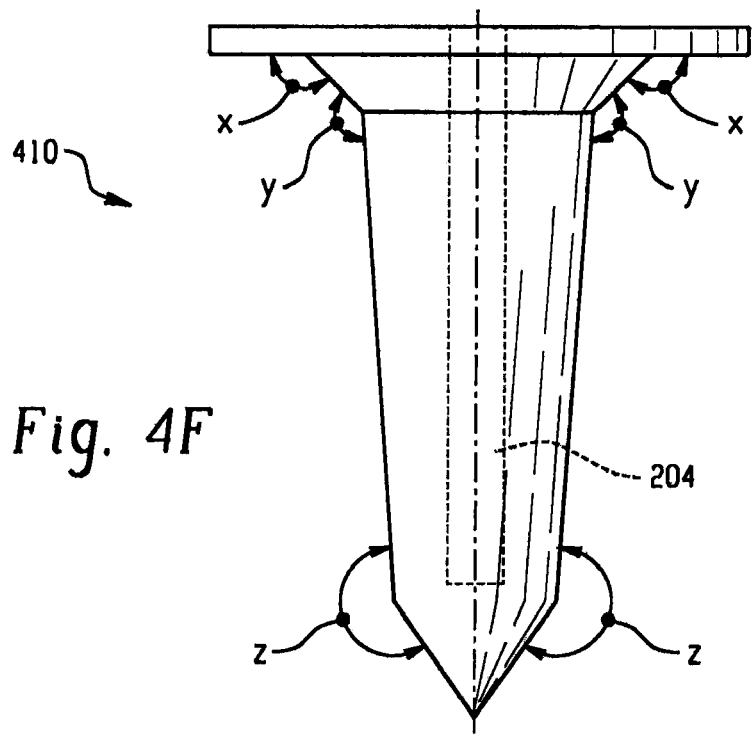
Figure 4G:
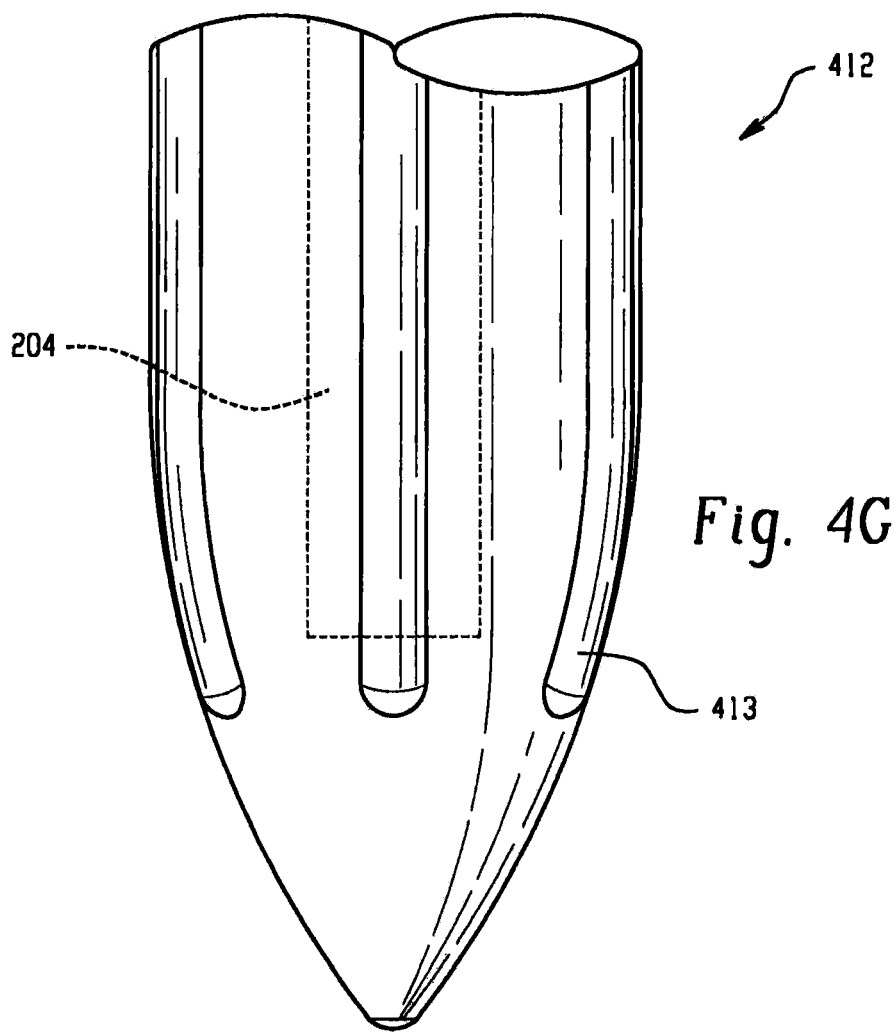
Figure 4H:
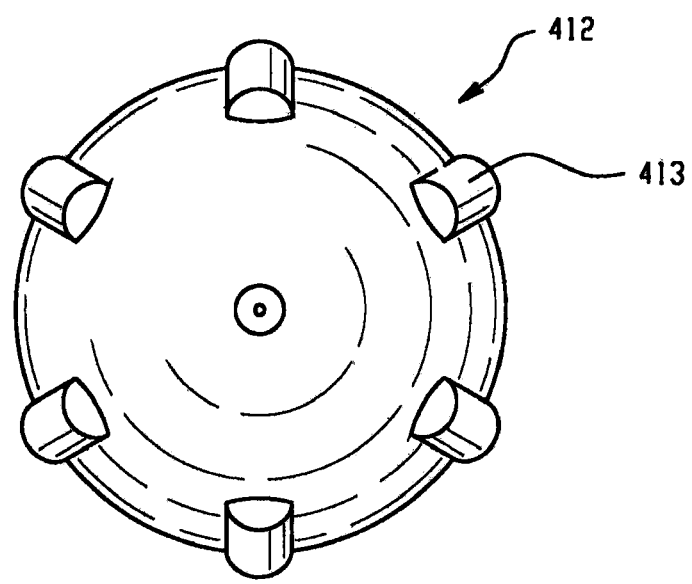
Figure 4I:
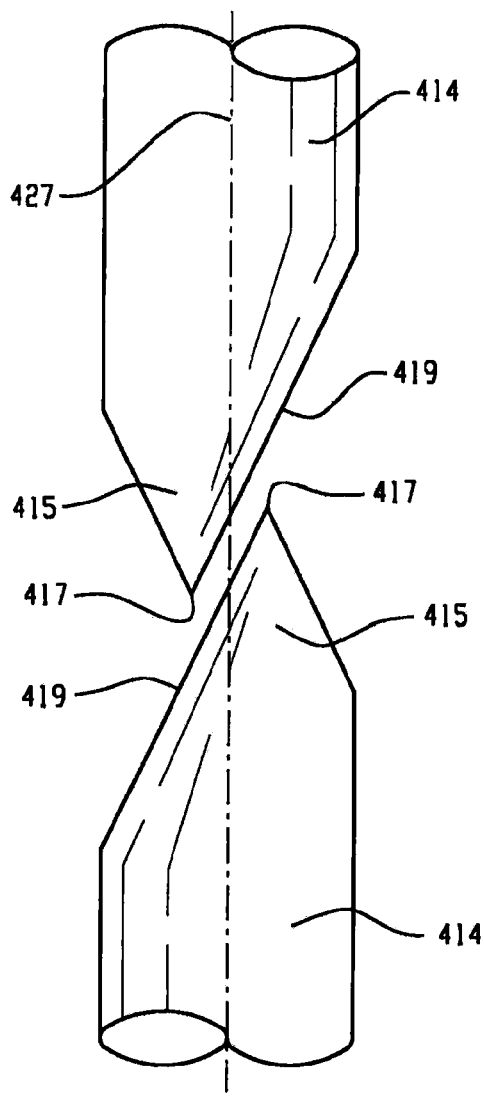
Figure 4J:
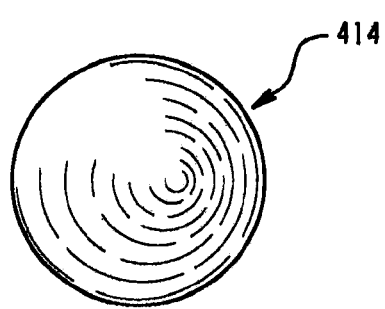
Figure 4K:
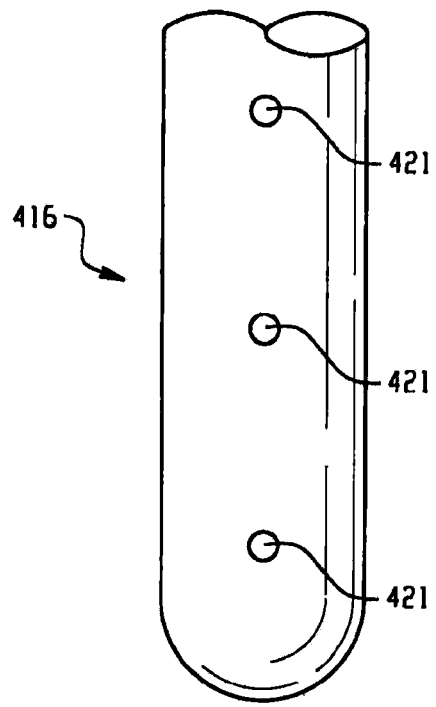
Figure 4L:
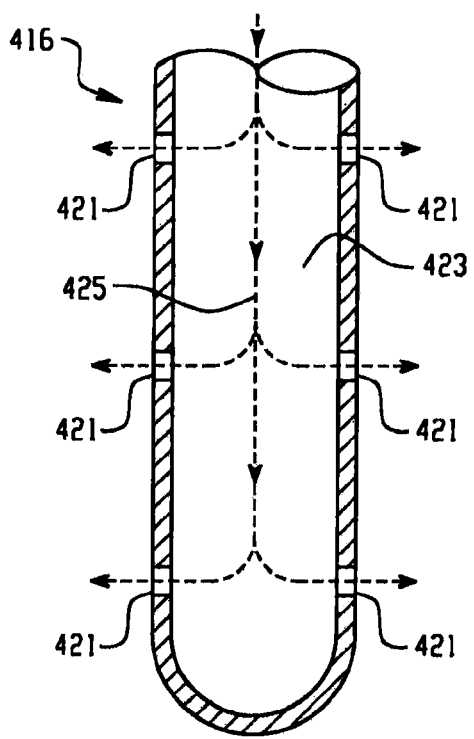

FIGS. 4A-4L illustrate a number of alternate mandrel embodiments that operate in a similar manner as the mandrel 202 (FIG. 2A) described above. Referring to FIG. 4A, a mandrel 402 is shown having the heated region 204 and a chamfer portion 403. The chamfer portion 403 and a cylindrical body portion 405 define an angle (A). In the illustrated example, the angle (A) is 45 degrees, however any alternate appropriate angle may be used. Referring to FIG. 4B, a mandrel 404 is illustrated having a curved portion 407 having a radius (r). Referring to FIG. 4C, a mandrel 406 is shown having a pointed distal tip 409. FIGS. 4D and 4E illustrate a side and bottom view respectively of a mandrel 408 having fin portions 411. FIG. 4F illustrates a mandrel 410 having multiple chamfered angles including angles (x), (y), and (z). FIGS. 4G and 4H illustrate a side and bottom view respectively of a mandrel 412 having a plurality of rib portions 413. The illustrated embodiment includes a mandrel 412 having six rib portions 413, however other embodiments may include any number of rib portions 413. FIGS. 4I and 4J illustrate a side and bottom view respectively of mandrels 414. The mandrel 414 includes an eccentric conically shaped distal end 415 that has a pointed portion 417 that is offset from a linear axis 427 of the mandrel 414. The distal end 415 includes a planar portion 419. In operation, the mandrels 414 may be inserted into the void 104 (of FIG. 1) and partially overlap. The offset pointed portion 417 may also facilitate inserting the mandrels 414 into voids 104 that are partially deformed or offset from the rotational axis 201 of the roll 102 (FIG. 2A). FIG. 4K illustrates a side view of a mandrel 416. The mandrel 416 includes a plurality of ports 421. FIG. 4L illustrates a side partially cut away view of the mandrel 416. The mandrel 416 includes an inner cavity 423 communicative with the ports 421. The mandrel 416 is operative to receive a fluid 425 under pressure that is emitted from the ports 421. The mandrel 416 may include any number of ports disposed in a variety of positions on the mandrel 416.

Figure 5:
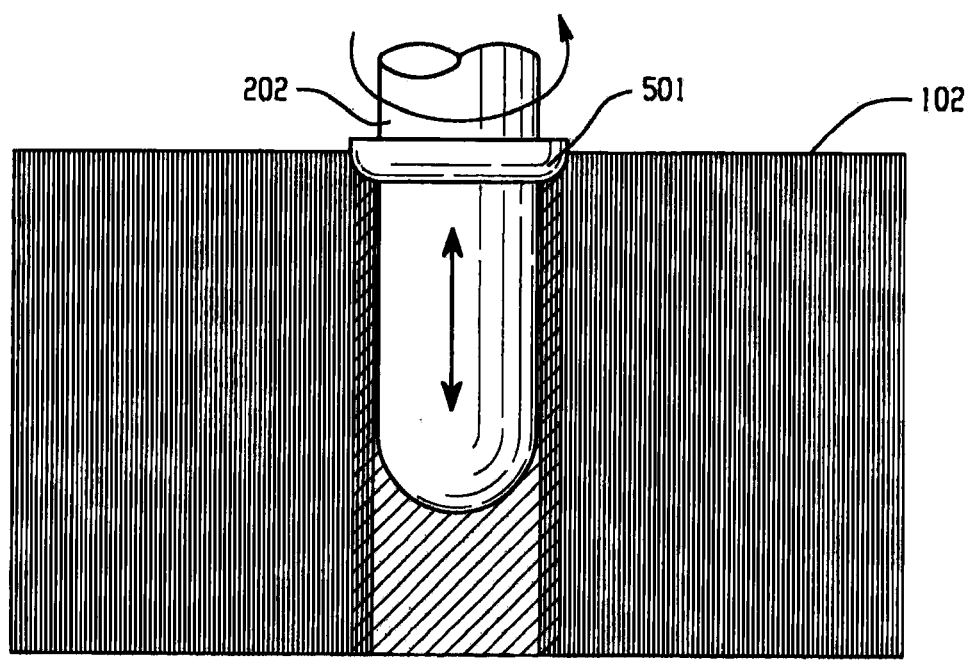
FIG. 5 illustrates the operation of an alternate exemplary embodiment of a mandrel.

FIG. 5 illustrates the alternate exemplary embodiment of a mandrel 202. In the illustrated embodiment the mandrel 202 is inserted into the roll 102 in a similar manner as described above. The mandrel 202 has a flared portion 501 that forms an indentation in the roll 102. The rotation and the heat of the mandrel 202 harden the moist layers of the roll to form a core portion and the indentation.

Figure 6A:
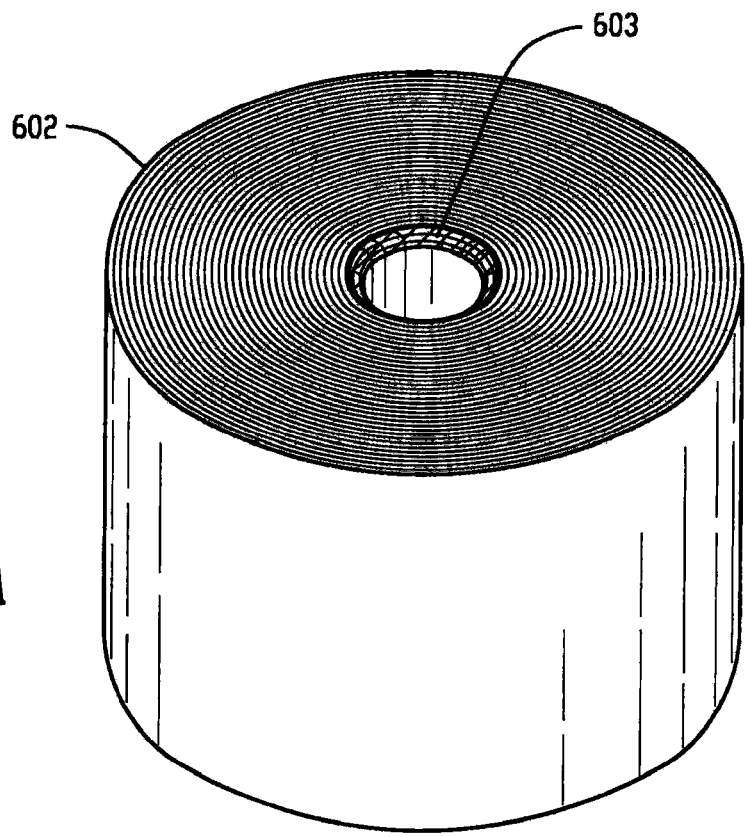
FIGS. 6A and 6B illustrate another alternate exemplary embodiment of a sheet product roll.
Figure 6B:
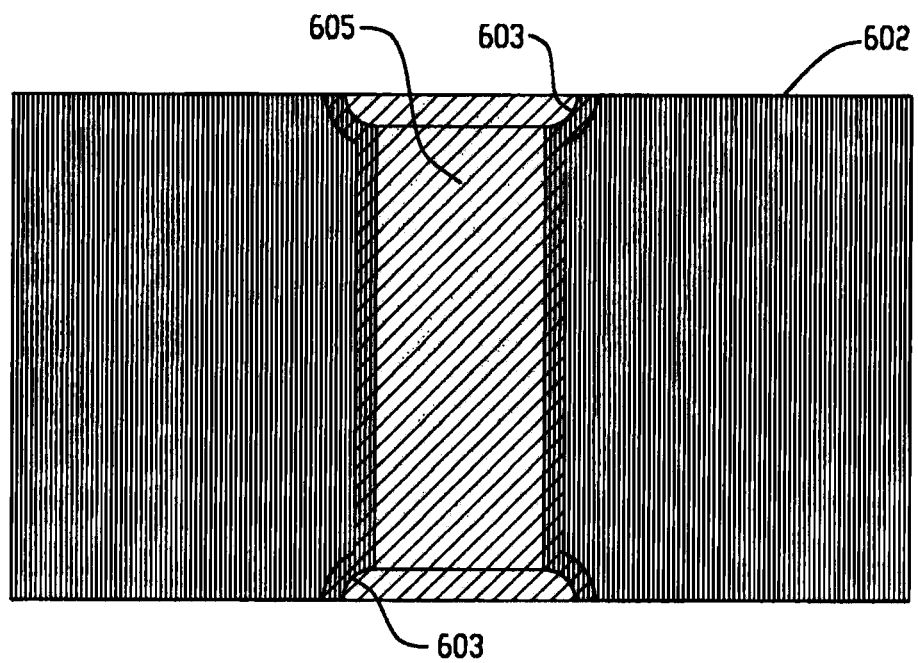

FIGS. 6A and 6B illustrate an exemplary embodiment of a roll 602 resulting from inserting the flared mandrel 202 described above in FIG. 5. FIG. 6A illustrates a perspective view of an example roll 602 having an indentation 603 portion. FIG. 6B illustrates a side partially cut-away view of the roll 602 having indentation portions 603 and core portion 605 represented by the shaded region. The core portion 605 has been hardened and dried by the mandrel 202. The indentation portions 603 ease the insertion of a dispenser spindle (not shown) by a user and may improve the fit of the roll 602 in a dispenser.

Figure 6C:
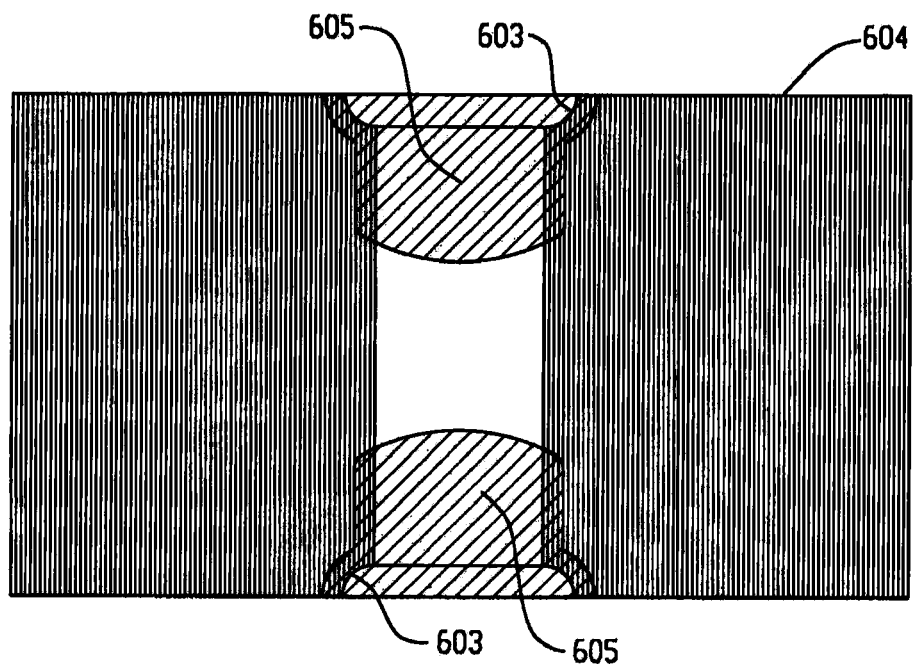
FIG. 6C illustrates another alternate exemplary embodiment of a sheet product roll.

FIG. 6C illustrates an alternate exemplary embodiment of a roll 604. The roll 604 is similar to the roll 602 described above, however prior to the insertion of the mandrel 202 (FIG. 5), the moistening of the roll 604 is not uniform across the cross section of the void 104 (FIG. 3) resulting in two hardened core portions 605 as shown.

Figure 7:
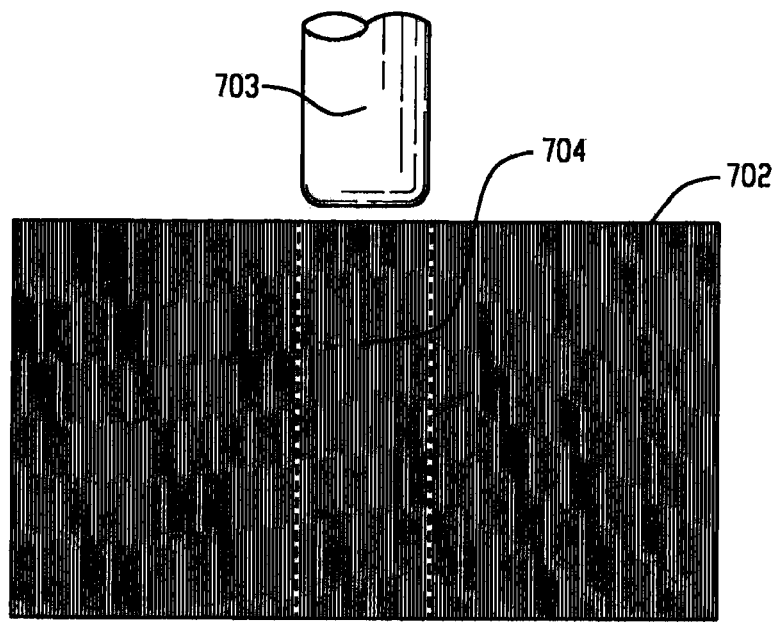
FIGS. 7 and 8 illustrate an alternate exemplary embodiment of a roll and core removal apparatus and method.
Figure 8:
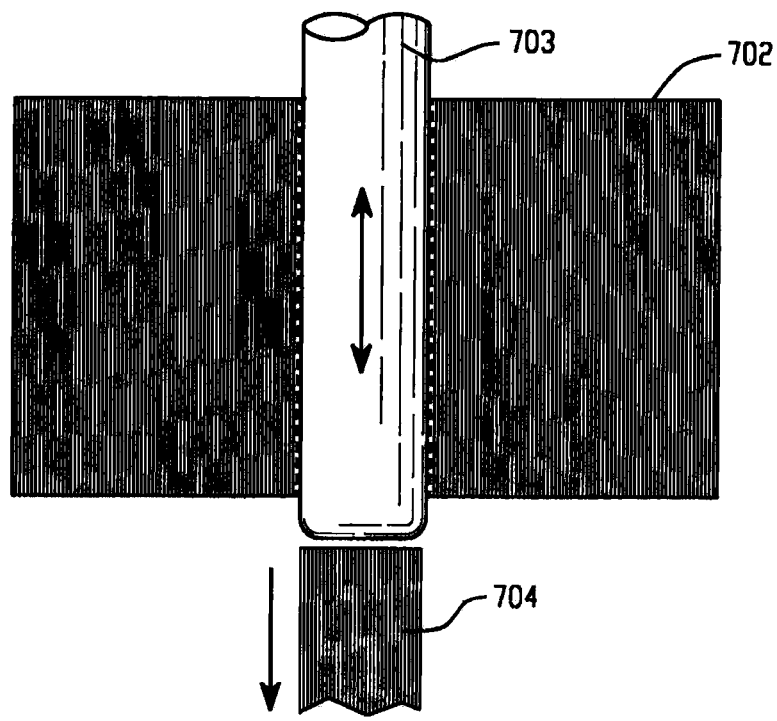

FIGS. 7 and 8 illustrate an alternate exemplary embodiment of a roll 702 and mandrel 703. Referring to FIG. 7, the roll 702 has a removable core 704. The removable core 704 may be formed from, for example, wound layers of sheet product material, and may be, for example cylindrical in shape having circular distal ends and a cylindrical longitudinal outer surface. The roll 702 is formed in wound layers around the removable core 704. The removable core 704 may be partially or fully removed from the roll 702 using the mandrel 703. In the illustrated embodiment, the mandrel 703 is cylindrical and has a flat distal end. For example, the mandrel 703 may engage a distal end of the removable core 704 and slidably push a portion of the removable core 704 out of the roll 702 to expose a portion of the longitudinal outer surface of the removable core 704. The removable core 704 may then be removed by gripping the exposed portion of the removable core 704 and slidably removing the removable core 704 using an automated process, or manually by a user. In an alternate exemplary embodiment, the mandrel 703 may slidably push the entire removable core 704 from the roll 702. In this regard, the mandrel 703 may, in some embodiments, not include heated regions 204 (FIG. 2B), and may not rotate. FIG. 8 illustrates the insertion of the mandrel 703 into the roll 702.

In fabrication, the caliber (thickness) of the sheet product may vary—resulting in rolls 702 having different outer diameters 101 (FIG. 1). It is desirable to insert the mandrels 703 along the rotational axis 201 (FIG. 2A) of the roll 702, since inserting the mandrel 703 off the rotational axis 201 may drive the mandrel 703 into the tightly wound sheet product of the roll 702 and damage the mandrel 703 or the connected machinery.

Figure 9A:
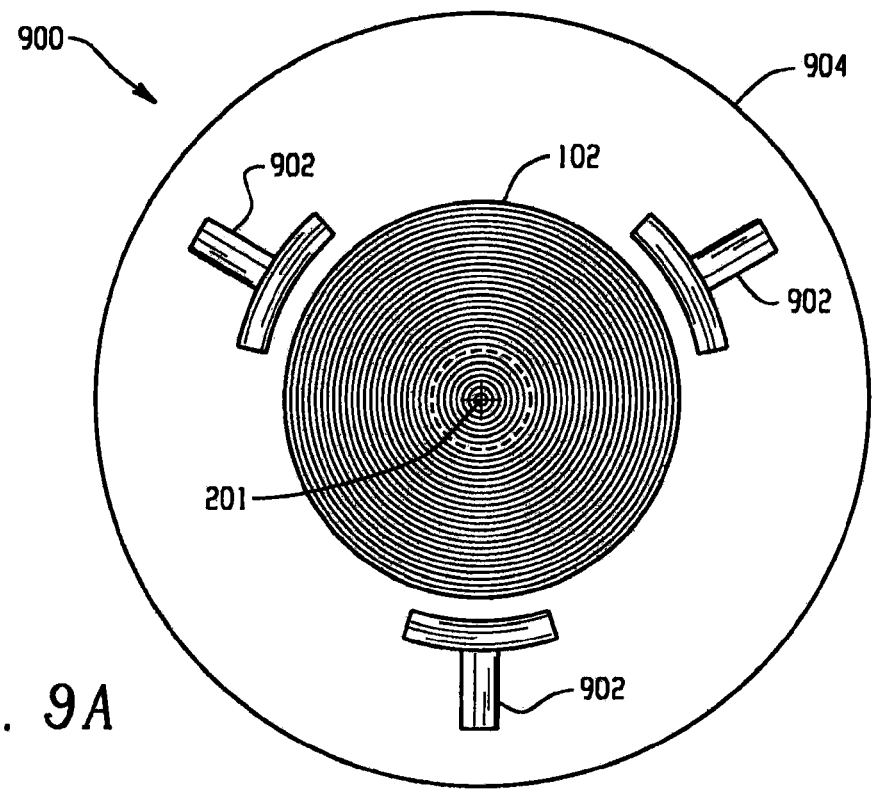
FIGS. 9A and 9B illustrate an exemplary method and assembly.
Figure 9B:
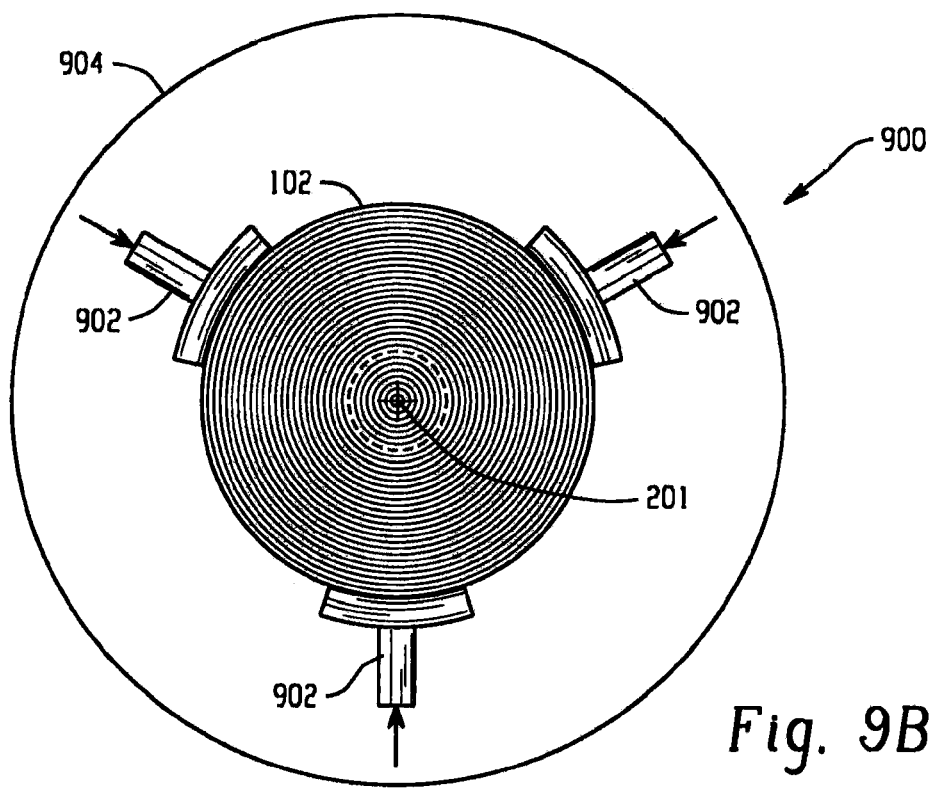

FIGS. 9A and 9B illustrate an exemplary method and assembly 900 that aligns the rotational access 201 of rolls 102 having a variety of outer diameters 101 (FIG. 1) with the mandrels 202 (FIG. 2A) or any other appropriate tool such as, for example, a drilling or boring device, a plug cutting device, or a pneumatic or hydraulic device. Referring to FIG. 9A, the roll 102 is placed between a plurality of dogs 902 disposed radially about the center of the assembly 900 on a base portion 904. In the illustrated embodiment, the dogs 902 are spaced with 120 degrees of separation about the center of the base portion 904. Each dog 902 has a curved surface that contacts the outer surface of the roll 102. The curved surface of the dog 902 is connected to a mechanical linkage that moves the dogs 902. Referring to FIG. 9B, in operation, the dogs 902 are slidably moved toward the center of the assembly 900. The dogs 902 position the rotational access 201 of the roll 102 in the center reference point of the assembly 900. The mandrels 202 (of FIG. 2A) are positioned in line with the center of the assembly 900. The dogs 902 exert pressure radially inward on the outer diameter 101 (FIG. 1) of the roll 102 that secures the roll 102 and allows the mandrels 202 be inserted into the void 104 (FIG. 1) linearly along the rotational axis 201 if the roll 102 to form the core portion in the void 104.

Figure 10:
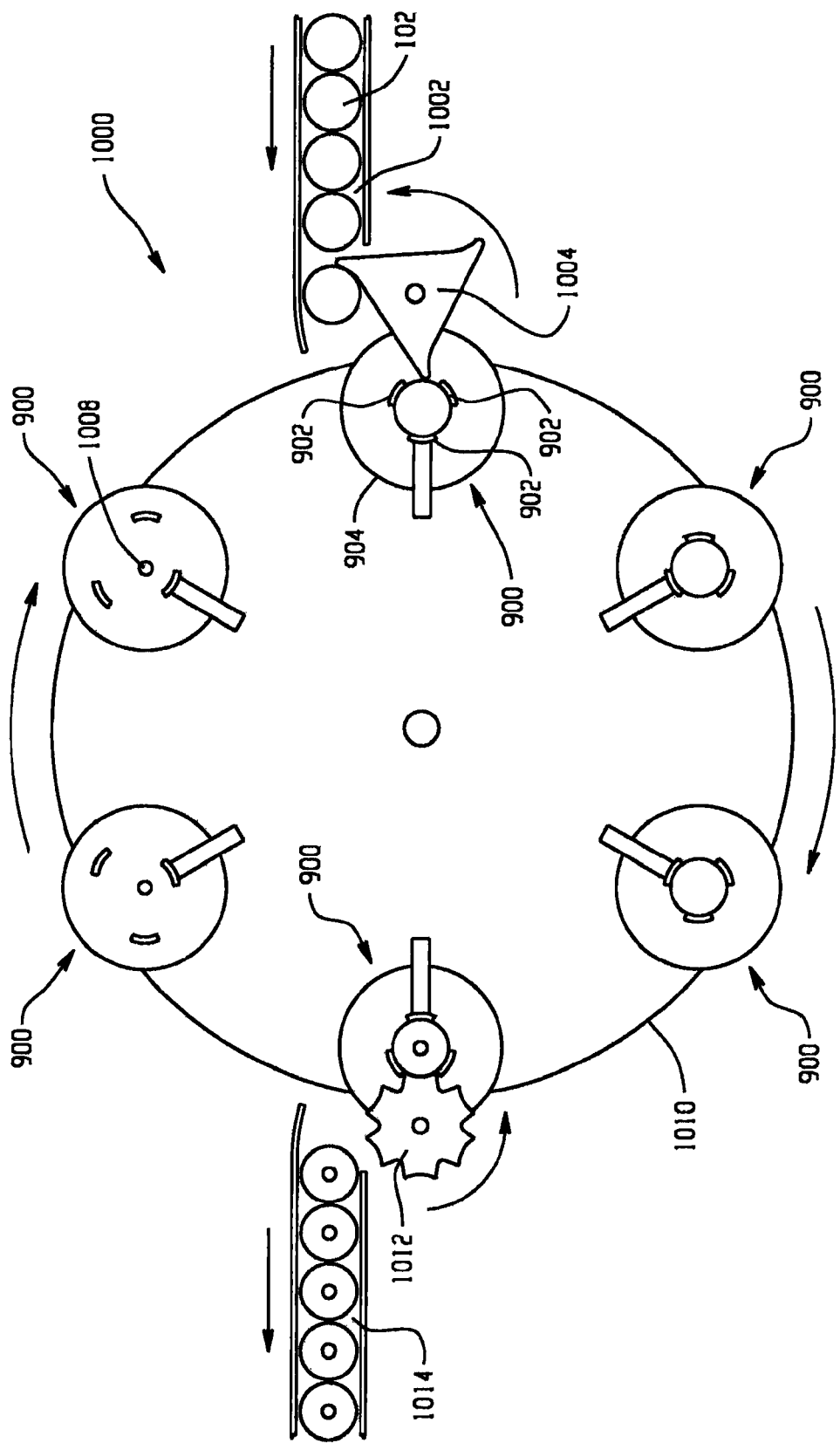
FIG. 10 illustrates an exemplary embodiment of a system.

FIG. 10 illustrates an exemplary embodiment of a system 1000 that incorporates a number of the features described above to efficiently fabricate the rolls 102. In this regard, the system 1000 includes an in-feed portion 1002 that may include, for example, a chute, slide, conveyer, roller assembly, or any other type of similar device. The in-feed portion 1002 guides rolls 102 to a guide 1004 that places individual rolls onto the assembly 900. As described above, the dogs 902 of the assembly 900 center and secure the roll 102 over the center of the assembly 900. In the illustrated embodiment, the assembly 900 includes a hole 1008 in the center of the base portion 904 that allows a tool, such as, for example, the mandrel 202 (FIG. 2A) to extend into the roll 102 from below the assembly 900. The system 1000 includes a plurality of the assemblies 900 attached to an indexing portion 1010 that rotates on a center axis. The rotation of the indexing portion 1010 allows a plurality of rolls 102 to be processed efficiently. The rolls 102 are processed as the indexing portion 1010 rotates. When the roll 102 approaches a guide 1012, the dogs 902 release the roll 102, and the guide 1012 pushes the roll 102 onto an out-feed portion 1014 that may be similar to the in-feed portion 1002 described above.

Figure 11:
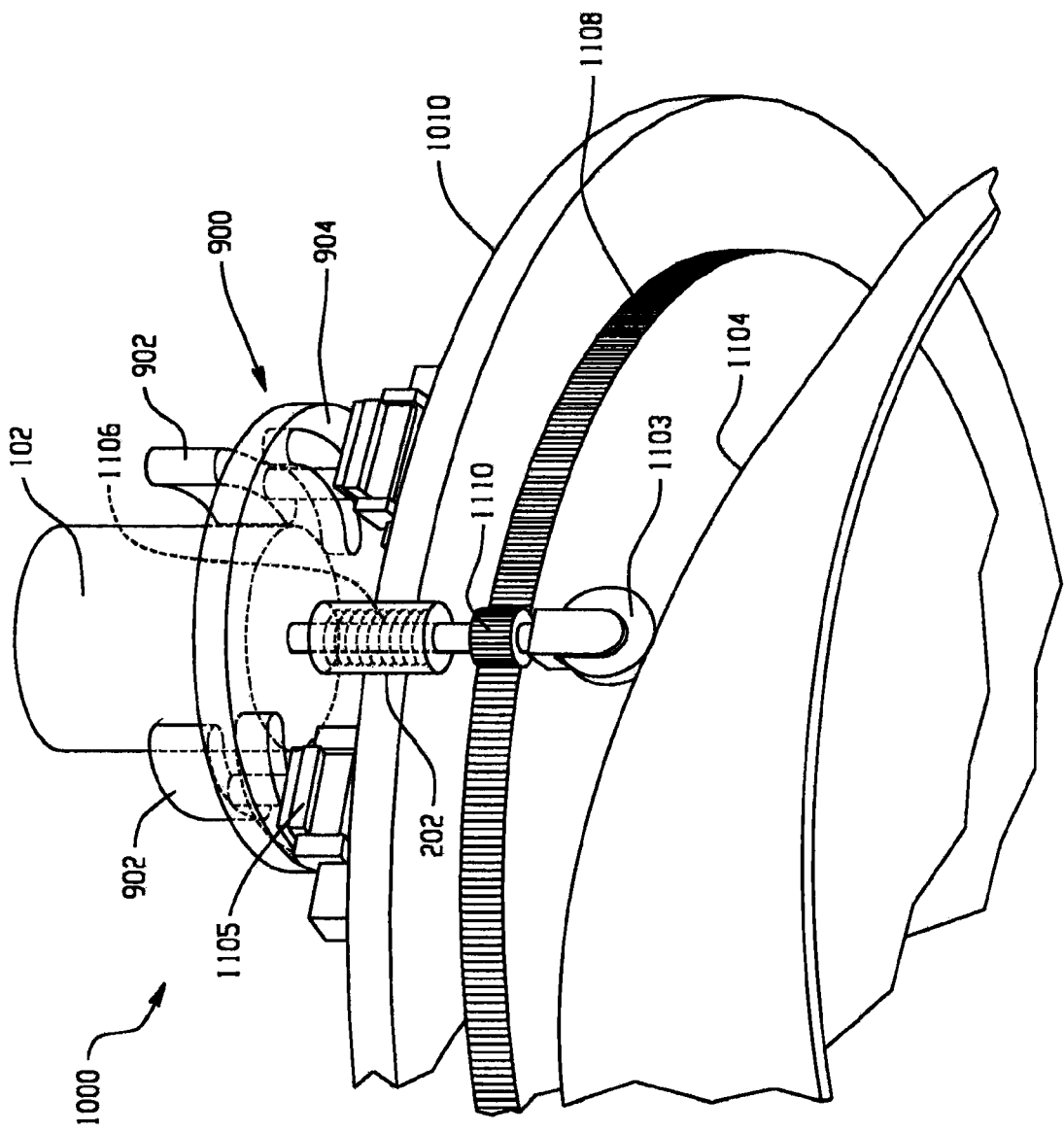
FIG. 11 illustrates a perspective partially cut-away view of a portion of the system of FIG. 10.

FIG. 11 illustrates a perspective partially cut-away view of a portion of the system 1000. The illustrated embodiment includes dog actuator portions 1105 that are connected to the dogs 902 of the assembly 900. The system 1000 includes a stationary first actuator portion 1104 disposed below the indexing portion 1010. The mandrel 202 or other type of tool is connected to a roller 1103. In operation, the roller 1103 linkage follows the sloped path of the first actuator portion 1104 as the indexing portion 1010 and roller 1103 rotate relative to the first actuator portion 1104. The sloped path of the first actuator portion 1104 moves the mandrel 202 linearly in and out of the roll 102. The mandrel 202 may be connected to a spring 1106 or other actuating device or force, such as, for example, a pneumatic or electrical device that exerts an expansive force on the mandrel 202 and the assembly 900 in the direction of the first actuator portion 1104. The spring 1106 assists in maintaining contact between the roller 1103 and the first actuator portion 1104. A geared linkage including a gear 1110 connected to the mandrel 202 and a gear 1108 may be used to rotate the mandrel 202 about the linear axis of the mandrel. The gear 1108 may be connected to the indexing portion 1010 or another motive element.

Figure 12:
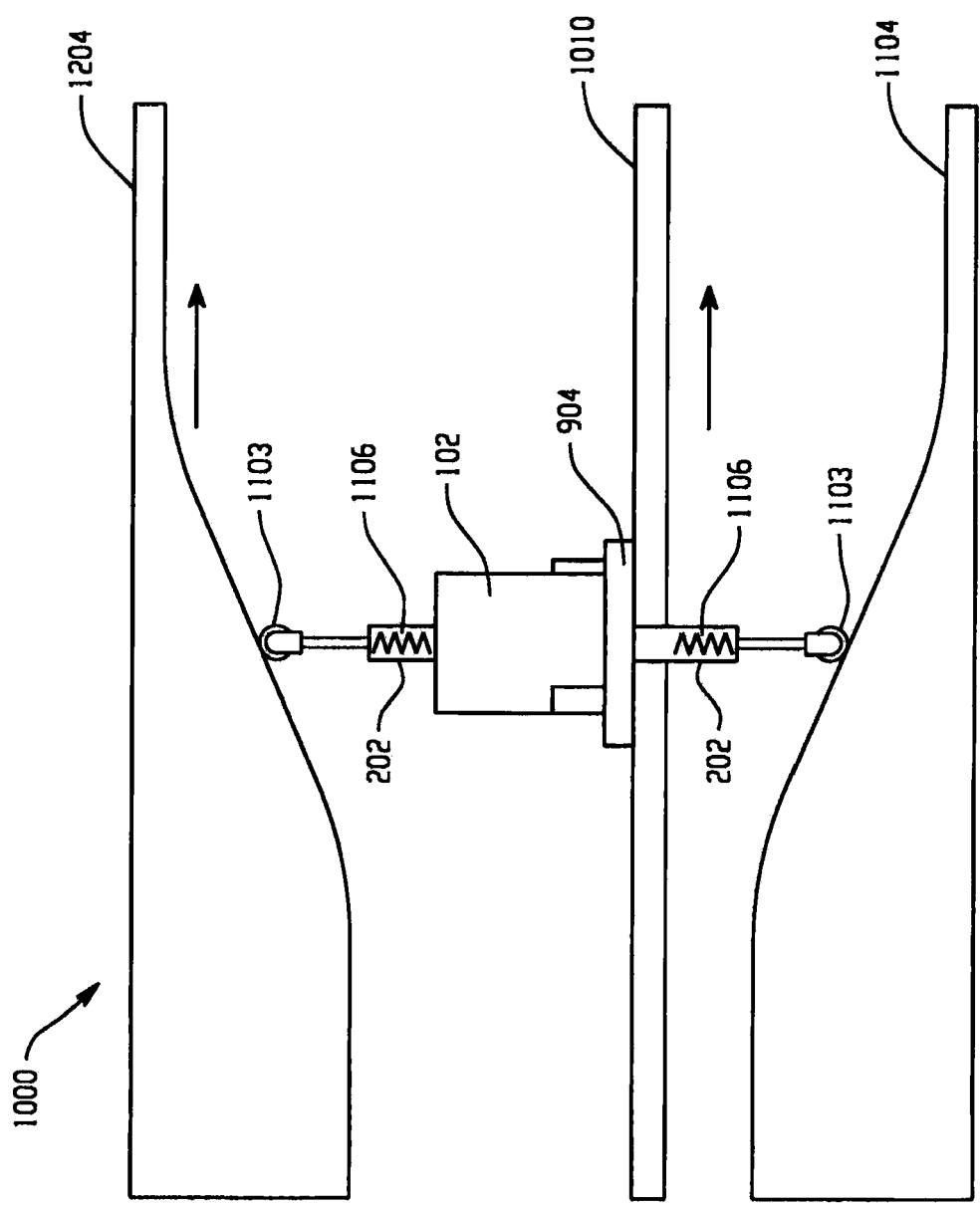
FIG. 12 illustrates a side partially cut-away view of a portion the system of FIG. 10.

FIG. 12 illustrates a side partially cut-away view of a portion the system 1000. The illustrated embodiment includes a second actuator portion 1204 that is similar to the first actuator portion 1104 (of FIG. 11). The second actuator portion 1204 moves a second mandrel 202 in a similar manner as described above in a direction opposing the first mandrel 202 (of FIG. 11).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for forming a core of a tubular sheet product roll comprising:
    a first tool operative to define a first portion of the core of the tubular sheet product roll;
    a first linkage connected to the first tool operative to move the first tool linearly along a linear axis of the first tool;
    a second linkage connected to the first tool operative to rotate the first tool axially about the linear axis of the first tool; and
    a first actuator portion having an arcuate inclined, sloped path operative to engage the first linkage.

2. The system of claim 1, wherein the first tool is a mandrel.

3. The system of claim 1, wherein the first tool includes a heating element operative to heat a portion of the first tool.

4. The system of claim 1, wherein the system includes a positioning assembly having a plurality of dog members disposed radially about the linear axis of the first tool operative to slide radially and align a rotational axis of the tubular sheet product roll with the linear axis of the first tool.

5. The system of claim 2, wherein the mandrel is cylindrically shaped.

6. The system of claim 2, wherein the mandrel includes a flared portion.

7. The system of claim 1, wherein the system further comprises a second tool operative to define a second portion of the core of the tubular sheet product roll.

8. The system of claim 2, wherein the mandrel includes a rib portion.

9. The system of claim 2, wherein the mandrel includes a conical tip having a point offset from a linear axis of the mandrel.

10. The system of claim 9, wherein the conical tip includes a planar portion.

11. The system of claim 7, wherein a linear axis of second tool is aligned coaxially with the linear axis of the first tool.

12. The system of claim 7, wherein the system further comprises a third linkage connected to the second tool operative to move the second tool linearly along the linear axis of the second tool; and
    a fourth linkage connected to the second tool operative to rotate the second tool axially about the linear axis of the second tool.

13. The system of claim 2, wherein the mandrel includes an inner cavity operative to receive a fluid, the inner cavity communicative with a port operative to emit the fluid.

14. The system of claim 13, wherein the fluid includes an adhesive.

15. The system of claim 13, wherein the fluid includes polyethylene glycol.

16. The system of claim 1, wherein the first linkage comprises a roller configured to travel along the inclined, sloped path of the first actuator portion.

17. The system of claim 1, wherein the first actuator portion is stationary.

18. A system for forming a core of a tubular sheet product roll comprising:
    a first tool operative to define a first portion of the core of the tubular sheet product roll;
    a first linkage connected to the first tool operative to move the first tool linearly along a linear axis of the first tool, wherein the first linkage includes a roller;
    a second linkage connected to the first tool operative to rotate the first tool axially about the linear axis of the first tool; and
    a first actuator portion having an inclined, sloped path operative to engage the roller of the first linkage.

19. The system of claim 18, further comprising a spring configured to assist in maintaining contact between the roller and the first actuator portion.

* * * * *